United States Patent Office 2,802,762
Patented Aug. 13, 1957

2,802,762

WELDING FLUXES

Alvin R. Stetson, San Diego, and Robert J. Pyle, Lemon Grove, Calif., assignors to Solar Aircraft Company, San Diego, Calif., a corporation of California No Drawing. Application August 19, 1953,
Serial No. 375,297

4 Claims. (Cl. 148—26)

This invention relates to welding fluxes and more particularly to fluxes for welding and brazing non-ferrous metals, especially "light metals" such as aluminum, magnesium and their alloys, i. e., alloys comprising at least 50% by weight of one or more light metals.

Since the advent of the now wide-spread use of the light metals for the countless items of manufacture which require the light weight, strength, corrosion-resistance and high thermal and electrical conductivity afforded thereby, industry has been faced with the problem of finding satisfactory means for welding and brazing these metals and their alloys. Welding and brazing aluminum, magnesium, and their alloys have imposed such exacting requirements on the welder that only the most highly skilled and experienced operators were capable of achieving even mediocre results and the rejection rate and wastage of parts has been high due to defective welds, melted parts, etc.

As these metals began to be used in greater quantities and found a wider variety to applications, particularly in the production of modern aircraft, a number of specialized welding fluxes were developed which, while far from perfect, offered a partial solution to the problem.

Perhaps the most popular and generally accepted of these fluxes are those known in the art as the "chloride base" fluxes which comprise, generally, a vehicle composed primarily of the alkali metal chlorides and certain active ingredients, the most important of which was the double salt $3NaF.AlF_3$, occurring in nature as the mineral "Cryolite."

While the "chloride base" fluxes are perhaps the most satisfactory heretofore developed, they still leave much to be desired for compatibility with the high speed welding techniques essential to efficient operation of modern mass production industries. The present invention is primarily concerned with improvements in such "chloride base" fluxes which substantially increase their effectiveness and reduce their cost. A typical flux of the "chloride base" type is disclosed in U. S. Patent 2,552,104.

Among the most common deficiencies of such prior art fluxes are the tendency to melt and flow at too low or too high a temperature, visual obstruction of the weld area due to slags and inclusions, lack of viscosity following melt and lack of fluidity during the welding cycle.

Another and equally important disadvantage of known fluxes is the high content of "Cryolite" which is relatively scarce, expensive and available only by importation from Greenland and is presently on the list of highly critical materials. While the double salt $3NaF.AlF_3$ which is the chemical equivalent of cryolite may be synthetized, the process is expensive and the product used in a flux, usually requires the addition of a substantial percentage of natural cryolite.

Accordingly, it is a basic general object of the present invention to provide improved fluxing compositions particularly useful in oxy-acetyline welding and for welding and brazing light metals and alloys thereof.

A further object of the invention is the provision of improved "chloride base" fluxing compositions which contain a low percentage of critical and expensive active ingredients, which speed and simplify welding and brazing operations, are easily applied, have better cleaning and oxide removal action and improved welding characteristics, are easily removed and do not produce corrosive pitting of the parent metal.

Still another object of the invention is the provision of novel fluxing compositions which give a clear indication when the actual welding temperature is approached, aid in control of the weld puddle thus facilitating the welding cycle, and which do not obstruct the weld area with opaque slags.

A further object is to provide novel fluxing compositions which will flow at welding temperature yet retain sufficient viscosity to remain in the weld area and form a protective coating throughout the welding operation.

These and other objects and the manner of fulfillment thereof will be apparent to those conversant with the art from a reading of the following description and subjoined claims.

It has been discovered that the difficulties and disadvantages outlined above stem not only from the ingredients of the fluxing compositions but in the specific proportions of the various constituents. Generally, known fluxes of the type contemplated by the invention, i. e., "chloride base" fluxes are composed chiefly of chloride salts forming a vehicle for fluoride salts which are considered the active ingredients. It has been found that a flux having the desired characteristics may be obtained only by the careful control in accordance with factors heretofore overlooked of the precise proportions of ingredients. Specifically it has been discovered that the optimum flux melting point may be obtained by adjustment of the ratio of chlorides to fluorides and the ratio of the chlorides to each other, and the best fluxing action with minimum flux is obtained by control of the fluoride ratio. A high chloride to fluoride ratio provides a flux which gives complete protection to the weld area without the formation of view obscuring slags, inclusions and the like.

The chloride base or vehicle is composed of alkali metal chlorides, namely sodium chloride (NaCl) and potassium chloride (KCl). In order to obtain the optimum melting characteristics and viscosity, the percentage of sodium chloride must at least equal that of the potassium chloride and in keeping within the critical chloride to fluoride ratio mentioned above, the critical range of proportions of the vehicle constituents is 42.5 to 44 percent by weight of NaCl and 42.4 to 40.9 percent by weight of KCl, the total chlorides amounting jointly to not less than 84.9 percent of the whole composition.

The balance, namely, 15.1% by weight of the whole mixture consists of the fluorides of lithium, sodium and aluminum, the latter two in the form of "Cryolite" ($3NaF.AlF_3$) which makes up a maximum of 8.5% of the whole and the former (LiF) constituting the remaining 6.6%.

As is readily computed from its chemical formula ($3NaF.AlF_3$) Cryolite consists by weight of 60% sodium fluoride and 40% aluminum fluoride and therefore the Cryolite content (8.5%) of the whole would consist of 3.4 percent $AlF_3$ and 5.1 percent NaF. Thus, the composition of the preferred form of flux is as follows:

CHLORIDES (VEHICLE) 84.9%

| Ingredients: | Percent by weight |
|---|---|
| Sodium Chloride (NaCl) | 42.5–44 |
| Potassium Chloride (KCl) | 42.4–40.9 |
| Total Chlorides | 84.9–84.9 |

FLUORIDES (ACTIVE INGREDIENTS) 15.1%

| | |
|---|---|
| Lithium Fluoride (LiF) | 6.6 |
| Sodium Fluoride [1] | 5.1 |
| Aluminum Fluoride [1] | 3.4 |
| Total Fluorides | 15.1 |

[1] Cryolite (Sodium Aluminum Fluoride 3NaF.AlF₃)

Good results have also been obtained by increasing the chloride to 85.1% with a corresponding decrease in the fluorides.

The flux powder is prepared by mechanically grinding the dry ingredients, preferably in a standard ball mill, to achieve a maximum granule size small enough to pass through a 150 mesh screen. While this degree of fineness is completely satisfactory, smaller granule size facilitates application of the flux to the work.

For use, an aqueous slip or slurry is prepared by mixing the flux powder with water and applied to the work piece, preferably by means of a brush. During the welding cycle, the flux remains inert until a temperature of approximately 1100° F. is reached, at which point the flux makes a liquidous transformation into clear transparent globules.

As the temperature increases to approximately 1150° F., the flux evinces extremely good wetting action and flows over the weld area. Since the optimum weld temperature is 1200° F., the inception of the wetting action of the flux provides a visible indication that the metal is ready for welding.

During the welding cycle, the flux remains a clear liquid, protecting the weld area and providing excellent cleaning and deoxidizing action and is sufficiently active and fluid to carry off the slag blanket. This action provides a clear view of the weld puddle and eliminates the necessity for removing slag with a puddling stick. The liquid flux also develops a more viscous film at the cooler edges of the weld puddle, thus, in effect aiding in control of the molten metal.

When the completed weld has cooled the flux may be easily soaked off in hot water or dilute sulphuric acid without damage to the parent metal.

From the foregoing description it will be apparent that a novel flux composition formulated according to the principles of the present invention is simple and inexpensive in constituency and manufacture and requires a maximum of 8.5% cryolite while providing means for facilitating and improving the welding and brazing of light metals.

The invention may be embodied in other specific forms without departing from the spirt or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An unsintered welding flux especially useful in the welding and brazing of aluminum and magnesium and alloys thereof, having vehicle components constituting in aggregate at least 84.9% by weight thereof, said vehicle components consisting of sodium chloride and potassium chloride, the sodium chloride being at least equal in weight to the potassium chloride, said flux having as the complementary components constituting the balance of ingredients lithium fluoride about 6.6% by weight, and cryolite about 8.5% by weight, said cryolite having a content of sodium fluoride of about 60% by weight and aluminum fluoride about 40% by weight, the total fluoride content being not more than 15.1% by weight of said flux.

2. A welding flux as claimed in claim 1 wherein the content of sodium and potassium chloride is increased to 85.1% with a corresponding decrease in the fluorides content.

3. An unsintered welding flux as claimed in claim 1, wherein the content of sodium chloride is from 42.5% to 44% and the content of potassium chloride is from 42.4% to 40.9%.

4. An unsintered welding flux as claimed in claim 1, wherein said flux is in the form of an aqueous slurry for torch welding.

References Cited in the file of this patent

UNITED STATES PATENTS

| | | |
|---|---|---|
| 943,164 | Schoop | Dec. 14, 1909 |
| 2,325,014 | Prendergast et al. | July 20, 1943 |
| 2,337,714 | Haim et al. | Dec. 28, 1943 |
| 2,456,609 | Andrews | Dec. 21, 1948 |
| 2,544,670 | Grange et al. | Mar. 13, 1951 |

FOREIGN PATENTS

| | | |
|---|---|---|
| 579,635 | Great Britain | Aug. 9, 1935 |